Sept. 26, 1950
T. W. SCIFRES
2,523,597
GAUGE FOR SETTING THE HEIGHT OF CUTTER
BITS ON METAL TURNING LATHES
Filed April 13, 1948
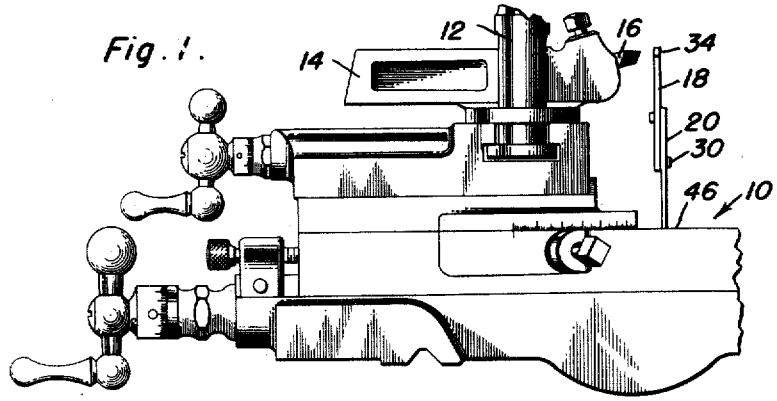
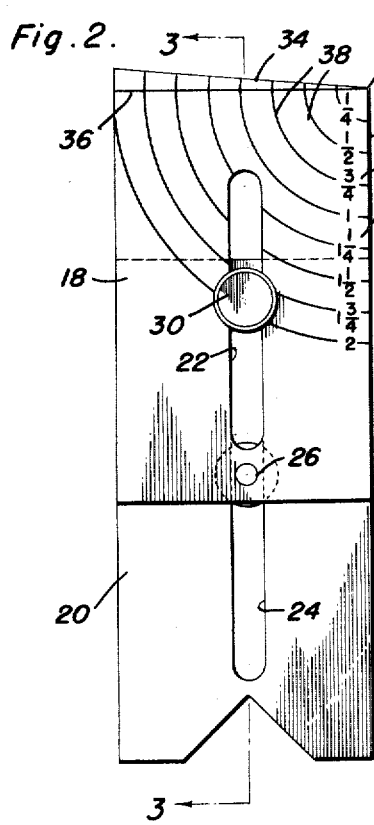
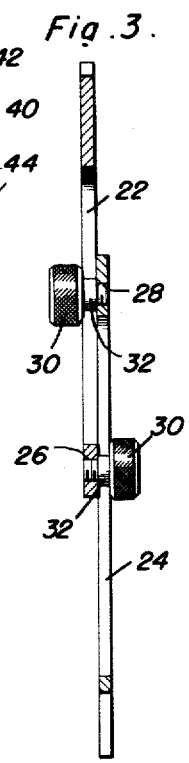
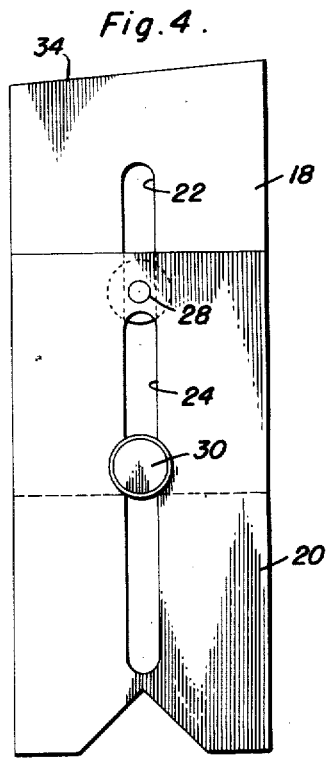
Thomas W. Scifres
INVENTOR.
BY
*Attorneys*

Patented Sept. 26, 1950

2,523,597

UNITED STATES PATENT OFFICE 2,523,597

GAUGE FOR SETTING THE HEIGHT OF CUTTER BITS ON METAL TURNING LATHES

Thomas W. Scifres, McGehee, Ark.

Application April 13, 1948, Serial No. 20,645

1 Claim. (Cl. 33—185)

This invention comprises novel and useful improvements in a gauge for setting the height of cutter bits on metal turning lathes and more specifically pertains to a bit or cutting tool setting gauge for positioning the cutting tool at a predetermined angle with respect to the horizontal plane through the center line of the work, regardless of its diameter, which may be journalled on a lathe.

The principal object of this invention is to provide a gauge whereby cutting bits may be accurately placed and mounted at a predetermined angle with respect to the horizontal plane extending through the central line of the work, on a lathe.

An important feature of the invention resides in the provision of a gauge consisting of a pair of longitudinally adjustable sections, which may be readily and easily adjusted for any type and size of lathe, and which will readily indicate and assist the proper positioning of a tool bit at a predetermined angle with respect to the work rotatably mounted upon the lathe centers.

A still further feature of the invention resides in the provision of a gauge as set forth in the preceding paragraph, which shall be of inexpensive construction and material such as sheet metal plates, and which will directly indicate for a given thickness of work piece, the proper setting of a bit at a predetermined angle with respect to the horizontal plane through the center of rotation of the work piece.

These, together with various ancillary features and objects of the invention which will later become apparent as the following description proceeds, are attained by this device, a preferred embodiment of which has been illustrated by way of example only in the accompanying drawings, wherein:

Figure 1 is a fragmentary perspective view illustrating a portion of the compound tool rest of a metal working lathe, and showing an embodiment of the present invention positioned thereon for gauging the height of a cutting tool;

Figure 2 is a front elevational view of a preferred embodiment of gauge in accordance with this invention;

Figure 3 is a vertical longitudinal sectional view taken substantially upon the plane of the section line 3—3 of Figure 2; and Figure 4 is a rear elevational view of the gauge shown in Figure 2.

Referring now more specifically to the accompanying drawings, wherein like numerals designate similar parts throughout the various views, attention is directed chiefly to Figure 1 for an understanding of the environment with which this invention is particularly adapted for use.

It may be here noted that when turning or cutting work pieces upon a metal working lathe, it is customary practice to so mount the cutting bit that its cutting edge contacts the work at the horizontal plane extending through the center line of rotation thereof when the material to be cut is of brass or other suitable metal; while when cutting or turning harder material such as steel, it is customary to position the cutting edge in contact with the surface of the work at about a five degree angle above said horizontal plane. Heretofore the proper positioning of a bit when mounted in conventional compound rests of metal working lathes, has been a matter of trial and error which is extremely wasteful of the mechanic's time, and is frequently inaccurate, thereby producing unsatisfactory machining of the work. By means of the present invention, the bit may be correctly positioned either in the horizontal plane through the axis of rotation of work of any desired size, or diameter, or may be accurately positioned at any predetermined angle such as the customary five degree inclination with respect to the horizontal plane, and this regardless of the diameter of the work piece.

In the customary compound tool rest indicated generally by the numeral 10 in Figure 1, there is provided a tool supporting post 12 of known design, which carries a tool holder 14 which is angularly adjustable in the vertical plane thereon, as well as being mounted for movement in a horizontal plane, which holder detachably secures any conventional type of cutting tool 16. The above mentioned parts are so conventional as to require no further explanation as to the operation and construction.

In accordance with this invention, a tool bit setting gauge is provided which preferably consists of a standard, which standard comprises upper and lower sections 18 and 20, which may be of any suitable material and may conveniently be formed of inexpensive sheet metal, and desirably may be of the same thickness and width, whereby the two sections are adapted to be longitudinally adjustable relative to each other.

This longitudinal adjustment is an important feature of the invention and is attained by providing longitudinally extending, medial slots 22 and 24 in the respective sections 18 and 20, while tapped or internally screw threaded bores 26 and 28 are formed respectively below and above the slots 22 and 24, to accommodate the screw threaded ends of fastening bolts.

These thumb screws have shank portions 32 which are slidable through the above mentioned slots 22 and 24, the ends of the shanks being threaded for engagement in the bores 26 and 28. As will be readily seen, it is merely necessary to loosen the two knurled thumb screws in order to longitudinally adjust the two sections 18 and 20, whereupon the screws may be tightened to lock the sections in their adjusted position.

The upper edge of the upper section 18, as indicated by the numeral 34, is inclined at a predetermined angle to the horizontal plane, this angle being preferably five degrees in accordance with conventional practice as set forth hereinbefore. A horizontal reference line 36 is provided upon the upper section 18, which reference line runs through the lowermost point of the upper edge 34, this reference line making the above mentioned five degree angle with the upper edge. With the intersection of this horizontal reference line with the upper edge 34, as a center, a plurality of arcuate setting lines 38 are formed upon the upper section 36, extending from the edge 40 which intersects the lowermost edge of the upper surface 34, these setting lines being provided at predetermined spaced radial distances from the above mentioned point of intersection designated by the numeral 42, and which setting lines intersect both the edge 40 and the edge 34. Suitable indicia, 44 are provided adjacent the edge 40, or at any other suitable place upon the setting lines 38, to designate the radial distances of the setting lines from their locus or center 42. Preferably, these indicia are calibrated to correspond with the diameter of the work which is to be gauged, and one suitable and typical example consists in providing the setting lines at one-eighth of an inch intervals from the center 42, and in calibrating these lines to read in one-quarter of an inch differences, whereby the calibrations will directly correspond with the diameters of the work pieces to be gauged.

From the foregoing, the manner of operating the device will now be understood. It is first necessary to adjust the individual gauge to the particular lathe with which the same is to be employed. For this purpose, the section 20 is positioned on the compound tool rest base indicated by the numeral 46, whereupon the horizontal reference line 36 is positioned level with or intersecting the line of centers between the two lathe head and tail stocks, the thumb screws being manipulated to longitudinally adjust the two sections for this purpose. When so set, the device is ready for use with that particular lathe and no further adjustment of the device is necessary. As will be understood, this longitudinal adjustment is necessary since different lathes have different vertical distances between their compound tool rest bases and their line of centers.

With the gauge thus held in the position shown in Figure 1, it is now merely necessary to adjust the tool bit 16 in the tool holder 14 and the latter in the tool post 12 in order to position the tool at the exact axis of rotation of the work, corresponding to the horizontal reference line 36. This adjustment is affected for turning or cutting soft metals such as brass, lead or the like.

When it is desired to set the tool bit for cutting harder metals such as steel or the like, the gauge is mounted in the manner indicated in the preceding paragraph, the work is placed between the lathe centers, the gauge is mounted as shown in Figure 1, and the tool bit is now adjusted until the same is leveled with or in the same plane as the inclined edge 34, the bit being positioned along the line 34 and at that point along the line which is intersected by the appropriate setting arcs 38 which correspond to the diameter of the work to be machined. It will thus be seen that for any given size or thickness of work to be rotated upon the lathe, that by appropriately choosing the setting line 38 corresponding to the diameter of the work, the tool bit 16 may be positioned at the proper vertical distance above the horizontal reference line 36 to give the desired five degree angle above the line of centers of the work, whereby the tool may be most effectively employed for operation upon the work.

From the foregoing, the manner of constructing and operating the device will be readily understood and further explanation is believed to be unnecessary.

However since numerous modifications will readily occur to those skilled in the art after a consideration of the foregoing specification and accompanying drawings, it is not intended to limit the invention to the exact construction shown and described, that all suitable modifications and equivalents may be resorted to falling within the scope of the appended claim.

Having described the invention, what is claimed as new is:

A cutter bit height gauge for lathes comprising a standard, said standard comprising longitudinally slidable, vertically adjustable sections, said sections having longitudinal slots and fasteners carried by each section and adjustably slidable in the slot of the other section, a horizontal line on said standard adapted to form a reference line for positioning said standard in level position with the line of centers of a lathe, a tool bit setting line on said standard intersecting and disposed at a predetermined angle to said reference line, a series of arcuate graduations on said standard having the intersection of said reference line and the setting line as a center, said graduations being calibrated to correspond and for registry with work of various diameters mounted in a lathe, the intersections of said graduations with said setting line designating the proper vertical adjustment of a tool bit to correspond with said predetermined angle from the center of rotation of the work piece mounted in a lathe to the outer diameter of the work piece.

THOMAS W. SCIFRES.

REFERENCES CITED

The following references are of record in the file of this patent:

UNITED STATES PATENTS

| Number | Name | Date |
|---|---|---|
| 563,089 | Strange | June 30, 1896 |
| 624,535 | Powel | May 9, 1899 |
| 689,825 | Miller | Dec. 24, 1901 |
| 1,245,304 | Zona | Nov. 6, 1917 |

FOREIGN PATENTS

| Number | Country | Date |
|---|---|---|
| 542,571 | Great Britain | Jan. 15, 1942 |